United States Patent
Nimmagadda et al.

[19]

[11] Patent Number: 6,130,941
[45] Date of Patent: Oct. 10, 2000

[54] METHOD AND SYSTEM FOR PROVIDING ACCESS AND CONTROL FOR TELEPHONE INFORMATION DATABASES

[75] Inventors: Prasad Nimmagadda, Nocross; Anita H. Simpson, Decatur, both of Ga.

[73] Assignee: BellSouth Intellectual Property Corporation, Wilmington, Del.

[21] Appl. No.: 09/015,459

[22] Filed: Jan. 29, 1998

[51] Int. Cl.$^7$ ...................................................... H04M 7/00
[52] U.S. Cl. ........................... 379/230; 379/207; 379/219
[58] Field of Search ................................... 379/207, 229, 379/230, 219, 220, 221, 222, 93.02, 93.03

[56] References Cited

U.S. PATENT DOCUMENTS

| | | | |
|---|---|---|---|
| 5,303,285 | 4/1994 | Kerihuel et al. | 379/114 |
| 5,311,572 | 5/1994 | Friedes et al. | 379/220 |
| 5,481,603 | 1/1996 | Gutierrez et al. | 379/207 |
| 5,517,562 | 5/1996 | McConnell . | |
| 5,550,912 | 8/1996 | Akinpelu et al. | 379/207 |
| 5,673,310 | 9/1997 | Andruska et al. | 379/93.02 |
| 5,673,311 | 9/1997 | Andruska et al. | 379/93.02 |
| 5,796,813 | 8/1998 | Sonnenberg . | |
| 5,825,862 | 10/1998 | Voit et al. | 379/93.03 |
| 5,854,836 | 12/1998 | Nimmagadda | 379/207 |
| 5,870,462 | 2/1999 | Vesterinen | 379/201 |
| 5,903,639 | 5/1999 | Lipchock et al. | 379/221 |
| 5,912,962 | 6/1999 | Bosco | 379/93.02 |
| 5,940,492 | 8/1999 | Galloway et al. | 379/207 |

FOREIGN PATENT DOCUMENTS 0 658 063  6/1995  European Pat. Off. ....... H04Q 11/04

OTHER PUBLICATIONS

International Search Report for PCT/US99/01589.
"LATA Switching Systems Generic Requirements; Class Feature: Calling Delivery Generic Requirements," Technical Refrence TR–NWT–001188, published Dec., 1991 by Bell Communications Research.

*Primary Examiner*—Krista Zele
*Assistant Examiner*—Benny Q. Tieu
*Attorney, Agent, or Firm*—James L. Ewing, IV; Nora M. Tocups; Kilpatrick Stockton LLP

[57] ABSTRACT

A method and system for controlling access to information stored in an information database includes an unbundled port service control point coupled to an unbundled port information database. A signal transfer point routes line information database, calling name information, and other queries from an originating network to the unbundled port service control point. The unbundled port information database stores an unbundled port identifier that includes a dialing number for an unbundled port and a service provider identifier. The unbundled port information database also stores an information service identifier that includes a location for the database storing the service provider's information and access rights to that information for various networks. The unbundled port service control point extracts the originating network identity from the query and determines access rights to the requested information based upon the access rights for the information as stored in the database. If the network has access rights to the information, the unbundled port service control point routes the query to the database location specified in the information service identifier.

18 Claims, 4 Drawing Sheets

| Unbundled Port Identifier 210 | | | Information Service Identifier (Example: LIDB) 220 | |
|---|---|---|---|---|
| Unbundled DN 212 | Loop Owner 214 | Service Provider 216 | Network Location for Information Service 222 | Access Rights to Info 224 |
| 404-222-1000 | Nw1 | Nw2 | Nw2:cl1:mem1 | Nw1 = yes; Nw2 = yes; Nw3 = yes; Nw4 = no |
| 404-555-2000 | Nw1 | Nw3 | Nw1:cl2:mem2 | Nw1 = yes; Nw2 = no; Nw3 = yes; Nw4 = no |
| 770-333-4000 | Nw2 | Nw1 | Nw1:cl4:mem5 | Nw1 = yes; Nw2 = yes; Nw3 = no; Nw4 = no |

| Unbundled Port Identifier 210 | | | Information Service Identifier (Example: LIDB) 220 | |
| --- | --- | --- | --- | --- |
| Unbundled DN 212 | Loop Owner 214 | Service Provider 216 | Network Location for Information Service 222 | Access Rights to Info 224 |
| 404-222-1000 | Nw1 | Nw2 | Nw2:cl1:mem1 | Nw1 = yes; Nw2 = yes; Nw3 = yes; Nw4 = no |
| 404-555-2000 | Nw1 | Nw3 | Nw1:cl2:mem2 | Nw1 = yes; Nw2 = no; Nw3 = yes; Nw4 = no |
| 770-333-4000 | Nw2 | Nw1 | Nw1:cl4:mem5 | Nw1 = yes; Nw2 = yes; Nw3 = no; Nw4 = no |

FIG 2

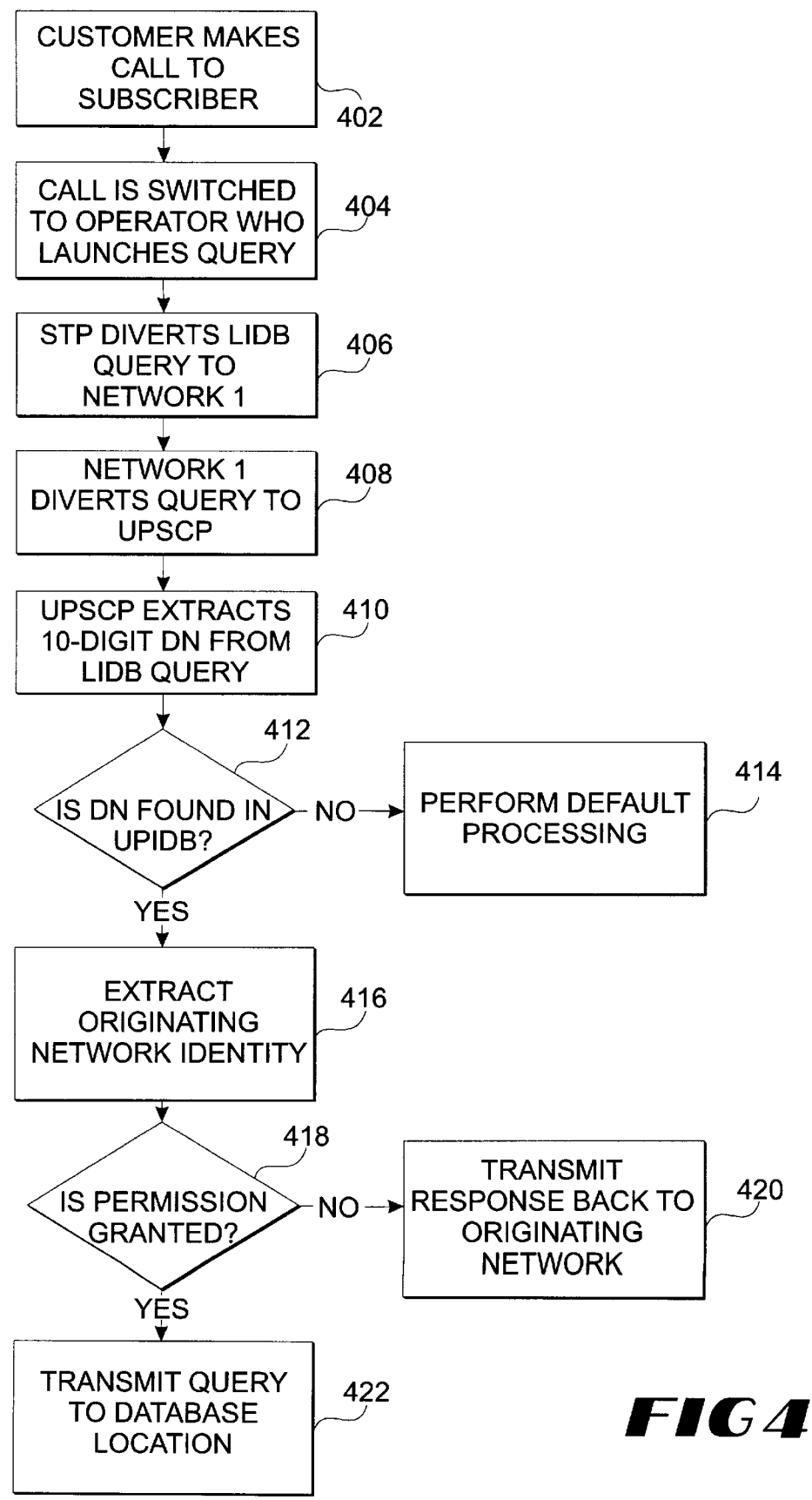

METHOD AND SYSTEM FOR PROVIDING ACCESS AND CONTROL FOR TELEPHONE INFORMATION DATABASES

BACKGROUND OF THE INVENTION

1. Field of the Invention

The present invention is directed to a method and system for providing access and control to information databases and, more particularly, to a system for local exchange carriers to control access to proprietary information in an unbundled network environment.

2. Background

The current telecommunications market is dominated by a group of incumbent local exchange carriers ("ILECs") that own switching infrastructures and possess intelligent network capabilities. Each ILEC provides local telephone service for a particular geographic region of the country. This monopoly has existed for many years, thus making it very difficult, and nigh impossible, for a small carrier to enter a market and establish a foothold. A carrier would be required to create its own switching infrastructure and intelligent network capabilities. Such a project would require the carrier to construct new telephone lines and cables, route those lines to each desired home, and create the necessary switching functionality. Clearly, this effort would cost millions, perhaps billions, of dollars for each emerging carrier.

Pursuant to the Telecommunications Act of 1996, the FCC has mandated certain "interconnection" requirements to make it easier for new carriers to enter a local telecommunications market. In FCC Report & Order in the matter of Local Competition, docket 96–98 released Aug. 8, 1996, the FCC required ILECs to "unbundle" certain elements of their existing telecommunications network. "Unbundling" is a regulatory requirement providing competitive local exchange carriers ("CLECs") or other information providers the ability to separately lease discrete functional components of an ILEC's network to provide service. An unbundled local loop, for example, is an ILEC-provided transmission path between, and including, the customer network interface (e.g., the jack) located at the end-customer's premises and the central office loop termination located in the ILEC's central office building. As another example, an unbundled port provides a CLEC with local switching functionality, in addition to the local loop, on an ILEC's switch as an alternative to providing a stand-alone switch. Numerous components may be unbundled, including the local loop, switch ports, and Advanced Intelligent Network ("AIN") triggers.

The unbundling requirement implicitly creates three types of local exchange carriers within a particular market. "Type A" LEC's, typically ILEC's, own and operate their own switching infrastructure and associate intelligent network database. "Type B" LEC's rely on an ILEC's switching infrastructure, but provide their own IN databases for competitive service differentiation (e.g., additional calling name service information). "Type C" LEC's rely entirely on the ILEC's switching and IN databases. Since Type A LEC's presently exist in the form of ILECs, the unbundling requirement brings Type B and Type C LEC's to the local marketplace.

As greater competition occurs in the telecommunications market, LEC's will look for ways to offer unique services to its subscribers. In the course of offering such services, LEC's will want to retain control of and limit access to subscriber information. For example, an LEC may wish to make its line information database ("LIDB") or calling name information accessible only to certain networks. In addition, an LEC may wish to store subscriber information in its own internal database(s) rather than an ILEC's database.

In the present scenario, however, only Type A LEC's have the requisite control over information databases and access to those databases. Type B and Type C LEC's (those LEC's created by the FCC's mandate) lack the ability to control access to their subscriber information. Type B LEC's must store proprietary subscriber information in the ILEC's databases since no current mechanisms are in place for partitioning databases across LEC's. Type C LEC's must also rely on the ILEC's databases since a Type C LEC completely reuses the ILEC's infrastructure. Moreover, Type C LEC's are subject to agreements between the host ILEC and third parties. Thus, for example, calling name information regarding a Type C LEC's customers will be accessible to the host ILEC as well as other carriers with whom the host ILEC has interconnection agreements.

As a result of this scenario, CLECs lack the ability to control access to their proprietary customer information. Thus, CLECs are not able to gain the competitive advantage sought by the FCC's unbundling requirement.

SUMMARY OF THE INVENTION

The present invention overcomes the problems of the prior art by introducing an unbundled port information service control point and an unbundled port information database. Queries for Type B and Type C CLEC data are automatically routed to the unbundled port service control point by a signal transfer point in the ILEC network. The unbundled port service control point accesses the unbundled port information database to determine whether a network may access the requested data. If the network has access rights, the query is routed to the database containing the requested information.

More particularly, calls that require verification of "unbundled status" of a port are transmitted by the signal transfer point to the unbundled port service control point. The query (e.g., line information database query) includes an identifier of the originating network. The unbundled port service control point extracts the dialing number and the originating network identity from the query. The service control point then searches the unbundled port information database for the dialing number.

The unbundled port information database stores location and access right information for a group of unbundled ports. Each unbundled port information database corresponds to a group of NPA-NXXXs. The database includes at least two fields, an unbundled port identifier field and an information service field for different types of information services. The unbundled port identifier field contains a DN subfield for the DN of the port, a service provider subfield identifying the service provider for the DN, and a local loop identifier subfield identifying the owner of the local loop containing the unbundled port. For each information service, an information service identifier includes a location subfield containing an SS7 point code address for the database storing information for the particular DN and the particular information service. The information service identifier also includes an access right subfield that identifies access rights for various networks. The unbundled port service control point accesses the information service field for a particular DN to determine whether the originating network has access rights to the information. If the service provider grants the originating network access rights, the unbundled port service control point transmits the query to the service control point/database location specified in the location subfield. The service control point/database storing the requested information will then transmit the information back to the originating network.

Thus, Type B and Type C CLECs may store information in their own databases or in the database of the ILEC. The CLECs may retain control over their proprietary information without relying entirely on ILEC elements. Moreover, Type C CLEC are no longer subject to the agreements between third parties and the ILEC regarding the exchange of information.

In accordance with the purpose of the invention, as embodied and broadly described herein, the invention is a method for controlling access to information stored in a telephone network database comprising the steps of: storing an unbundled port identifier in an unbundled port information database; storing an information service identifier in the unbundled port information database, the information service identifier determining an access right to information for at least one network; routing a query for requested information from an originating network to an unbundled port service control point having access to the unbundled port information database; accessing the unbundled port information database to determine a right of the originating network to access the requested information; and routing the query to the telephone network database if the information service identifier grants an access right to the requested information to the originating network.

In further accordance with the purpose of this invention, as embodied and broadly described herein, the invention is a system for controlling access to information stored in a telephone network database comprising: an unbundled port service control point; an unbundled port information database coupled to the unbundled port service control point, the unbundled port information database storing an unbundled port identifier and an information services identifier; and a signal transfer point coupled to the unbundled port service control point, the signal transfer point routing a query for requested information from an originating network to the unbundled port service control point.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 2 is an illustration of unbundled port information stored in an unbundled port information database.

FIG. 4 is a call flow diagram illustrating steps performed by the present invention during a line information database query involving a Type C CLEC subscriber.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

Figure 1:
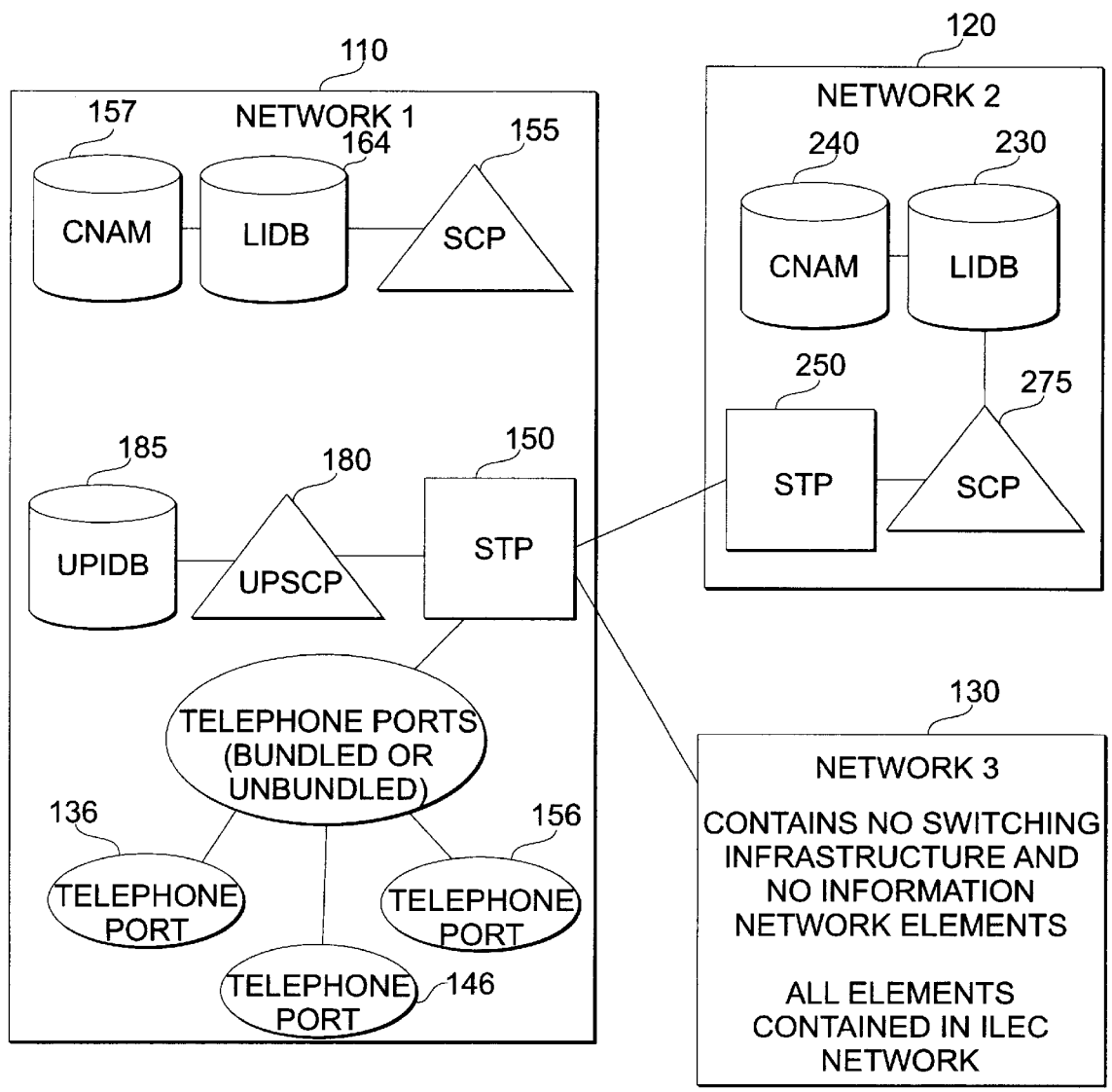
FIG. 1 is a block diagram of an exemplary group of telephone networks, in accordance with a preferred embodiment of the present invention.

FIG. 1 is a block diagram of an exemplary group of telephone networks interconnected via Signaling System #7 ("SS7") and operating in a locally competitive environment, in accordance with a preferred embodiment of the present invention. More specifically, the network includes a network 110, Network 1, serviced by an incumbent local exchange carrier ("ILEC"), a second network 120, Network 2, serviced by a Type B competitive local exchange carrier ("CLEC") and a third network 130, Network 3, serviced by a Type C CLEC. The network may also include a fourth network (not shown) serviced by other competitive carriers. All three networks 110, 120, 130 may overlap to the extent that certain network elements have been unbundled by the ILEC.

The ILEC network 110 includes one or more signal transfer points 150 ("STPs") for routing messages to and from other network nodes, including a calling name database 157, a line information database 164 calling name service control point 155 ("SCP"), an Unbundled Port service control point 180 (described in greater detail below), and numerous telephone ports 136, 146, 156 that are coupled to end user facilities. Telephone ports 136, 146, 156 may be controlled by the ILEC or unbundled to CLECs.

A Type B CLEC services Network 2 120. Type B CLECs rely upon an ILEC's switching infrastructure, but wish to provide their own intelligent network ("IN") services for competitive service differentiation. Accordingly, the Type B CLEC network 120, includes IN elements for providing such services. In particular, the network 120 includes a service control point 275 ("SCP"). The SCP 275 accesses one or more databases, such as, for example, a line information database 230 ("LIDB") and a calling name database 240. LIDB 230 stores information regarding Type B subscriber lines. Calling name database 240 stores information regarding Type B subscribers, including name and telephone information. Databases 230, 240 are illustrated for exemplary purposes only. Network 120 may include fewer or more IN databases. The SCP 275 includes processing logic for both processing and routing messages. Although the SCP 275 is not a database itself, it may be collocated with databases 230, 240. Network 120 further includes a signal transfer point 250 ("STP") for routing SS7 messages to and from SCP 275. Network 120 contains no other switching capability.

A Type C CLEC services Network 3 130. Type C CLECs rely entirely upon an ILEC's switching infrastructure and IN databases. Accordingly, Network C 130 does not include any switching or IN elements. Nevertheless, a Type C CLEC may offer its subscribers certain IN services, such as calling name and LIDB. The CLEC must store its IN information in the ILEC's databases.

To facilitate access to and control of Type B and Type C CLEC subscriber information, ILEC network 110 includes one or more unbundled port service control points ("UPSCPs") 180 and one or more associated Unbundled Port Information Databases ("UPIDBs") 185. The UPIDB 185 contains data regarding the location of and access rights to information owned by particular CLECs servicing unbundled ports. The UPSCP 180 includes processing logic for storing and retrieving data to and from UPIDB 185. Preferably, each UPSCP 180 and corresponding databases(s) provide service to a particular area of service corresponding to a group of NPA-NXXXs.

FIG. 2 is an illustration of how unbundled port ("UP") information may be stored in UPIDB 185. Information is stored in several fields, including an unbundled port identity field 210, and one or more information service identification fields 220. The unbundled port identity field 210 identifies particular unbundled ports within an area of service. The field 210 includes three subfields corresponding to a dialing number ("DN") for an unbundled port: (1) a 10-digit dialing number subfield 212 identifying the telephone number; (2) a network identity subfield 214 identifying the owner of the local loop containing the unbundled port; and (3) a network identity subfield 216 identifying the service provider for the loop. Network identifiers 214, 216 may be formatted as text containing a predetermined number of alphanumeric characters.

The information service identification field 220 identifies the location and access rights for a particular information service. The location and access rights for the identified service correspond to the unbundled port in the unbundled port identity field 210. In FIG. 2, the information service is identified as a LIDB service. The information service identification field 220 includes at least two subfields: (1) a database location subfield 222 containing an SS7 point code or address for the particular information service database; and (2) an access right subfield 224 containing a list (or array) of various originating networks and their access rights as determined by the service providers identified in subfield 216. The access subfield 224 may identify access to the information service using a "yes" or "no" text identifier coupled to a network identifier. Although only one information service, LIDB, is illustrated, other information services may be included.

For illustrative purposes, FIG. 2 includes sample data stored in fields 210, 220: For example, the DN "404-222-1000" is on a local loop owned by Network 1 "(NW1"). The DN receives local service from Network 2 ("NW2"). The LIDB information for this DN is located in a Network 2 internal database (point code: "NW2:c17:mem1"). Network 2 grants access rights to Network 1, Network 2, Network 3, but not Network 4. Row 2 of the table 200 illustrates an LEC using an incumbent's LIDB database to store proprietary customer information. A DN, "404-555-2000," located on a local loop owned by Network 1, received local service from Network 3. Network 3 stores LIDB information for this DN in Network 1's database (point code: "NW1:c12:mem2"). Network 3 grants access to its LIDB information to Network 1 and Network 3, but not Network 2 or Network 4. Thus, Type B CLECs and Type C CLECs may control access to their proprietary information without owning either switching infrastructure or IN databases.

Figure 3:
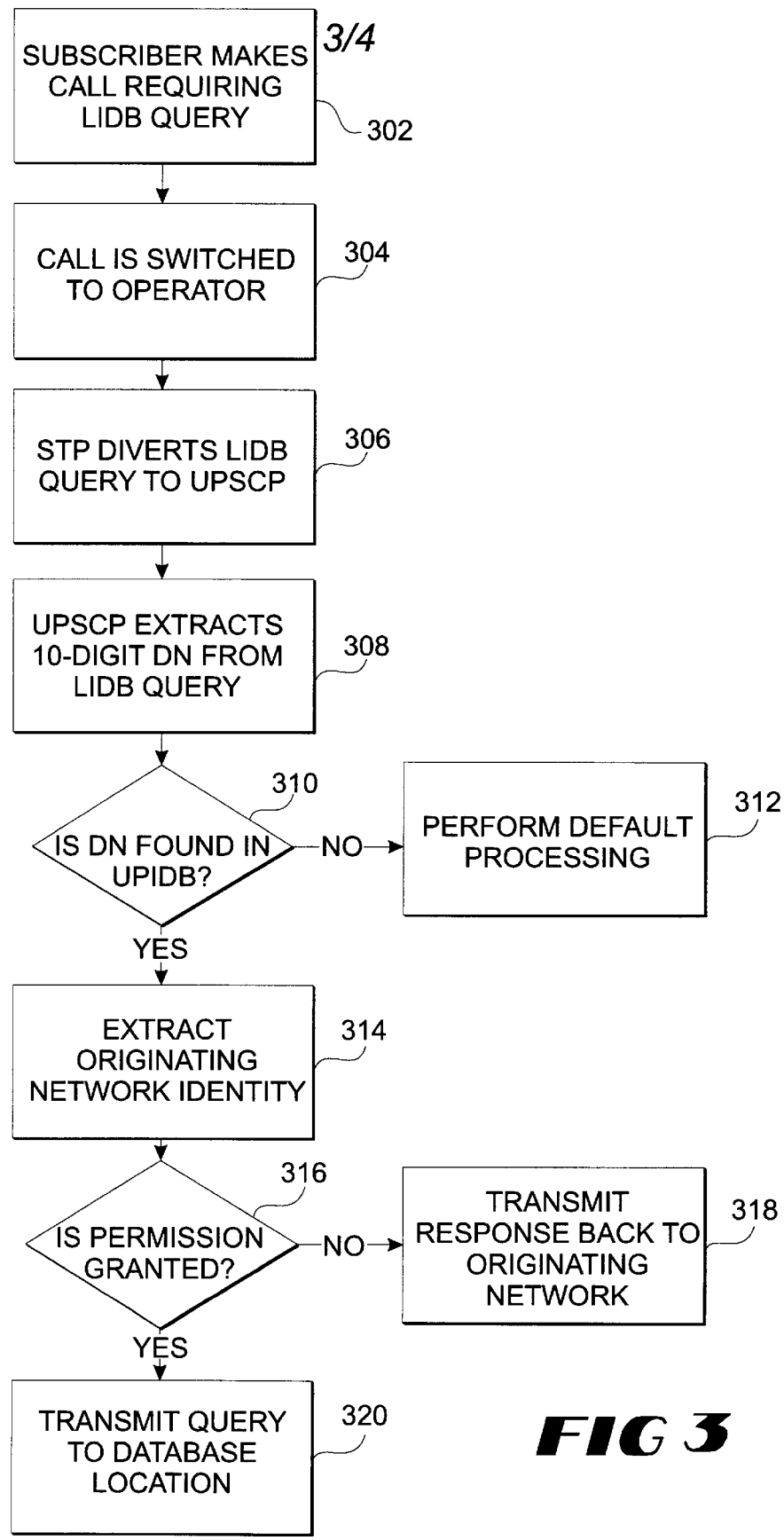
FIG. 3 is a sample call flow diagram illustrating steps performed by the present invention during a line information database query from a Type B CLEC subscriber

FIG. 3 is a sample call flow diagram illustrating steps performed by the present invention during a LIDB query from a Network 2 (Type B CLEC) subscriber. In Step 302, a Network 2 subscriber on a unbundled port initiates a call requiring an LIDB query (for example, a credit card call). The call may be made from the customer's home or from another location. In Step 304, the call is switched to an operator from the calling location that launches a LIDB TCAP query with the subscriber's DN as the number requiring verification. The LIDB query further includes the identity of the originating network. The STP, in step 306, diverts the LIDB query to UPSCP in step 308 via preprogrammed data that maps NPA-NXXs to a given UPSCP.

In Step 308, UPSCP extracts the 10-digit DN from the LIDB query. The UPSCP searches UPIDB 185 in Step 310. If no entry is found in the UPIDB 185, UPSCP 180 performs default routing of the query based on the NPA-NXX of the DN. If the UPSCP finds an entry for the DN, in step 314, the UPSCP extracts the originating Network Identifier from the query. In Step 316, UPSCP 180 accesses subfield 224 to determine access rights for the originating network. If access is permitted, UPSCP 180, in step 320, routes the query to the point code address of subfield 222 of the corresponding DN. If permission to the originating network is denied, the UPSCP 180 transmits a response back to the originating network (operator) indicating that the LIDB query may not be routed due to insufficient permissions. As this example illustrates, a Type B CLEC can maintain ownership of its proprietary data in its internal databases and control access to those databases.

FIG. 4 is a call flow diagram illustrating steps performed by the present invention during a LIDB query involving a Network 3 (Type C CLEC) subscriber. In step 402, a Network 2 subscriber initiates a call to another Network 3 subscriber requiring a LIDB query (for example, a collect call). In step 404, the ILEC operator launches a LIDB TCAP query with the called party's number as the DN. The LIDB query also includes the network identity (Network 2). In step 406, the STP directs the LIDB query to Network 1. In step 408, the Network 1 STP routes the LIDB query to the UPSCP 180. The UPSCP 180 extracts the 10-digit DN from the LIDB query and accesses UPIDB 185 for a corresponding entry. If an entry is found, the UPSCP 180 extracts the originating network identity from the LIDB query to determine access rights. The network is allowed access to the information, the UPSCP 180 routes the query to the point code stored in the location field 222. In this example, however, Network 2 is not allowed access to Network 3's LIDB information. Thus, UPSCP 180 transmits a response to Network 2 indicating that access has been denied.

Having thus described a preferred embodiment of a method and system for providing access and control for telephone information databases, it should be apparent to those skilled in the art that certain advantages have been achieved. It should also be appreciated that various modifications, adaptations, and alternative embodiments thereof, may be made within the scope and spirit of the present invention. The invention is further defined by the following claims:

What is claimed is:

1. A method for controlling access to information stored in a telephone network database comprising the steps of:

storing an unbundled port identifier in an unbundled port information database;

storing an information service identifier in the unbundled port information database, the information service identifier determining an access right to information for at least one network;

routing a query for requested information from an originating network to an unbundled port service control point having access to the unbundled port information database;

accessing the unbundled port information database to determine a right of the originating network to access the requested information; and routing the query to the telephone network database if the information service identifier grants an access right to the requested information to the originating network.

2. The method for controlling access to information, as recited in claim 1, wherein the step of storing an unbundled port identifier further comprises the step of storing a dialing number of the unbundled port in the unbundled port information database.

3. The method for controlling access to information, as recited in claim 2, wherein the step of storing an unbundled port identifier further comprises the step of storing an identifier of an owner of a loop containing the unbundled port.

4. The method for controlling access to information, as recited in claim 1, wherein the step of storing an information service identifier further comprises the step of storing a location of the telephone network database.

5. The method for controlling access to information, as recited in claim 4, wherein the location of the telephone network database is stored as a Signaling System #7 point code.

6. The method for controlling access to information, as recited in claim 1, wherein the step of routing a query further comprises the steps of:

sending the query to a signal transfer point;

extracting a dialing number from the query; and routing the query to the unbundled port service control point based on the dialing number.

7. The method for controlling access to information, as recited in claim 1, further comprising the step of extracting an identifier of the originating network from the query.

8. The method for controlling access to information, as recited in claim 7, wherein the step of accessing the unbundled port database further comprises the step of comparing the originating network identifier extracted from the query with a network identifier contained in the information service identifier.

9. A method for controlling access to information stored in a telephone network database comprising the steps of:

storing a dialing number of an unbundled port in an unbundled port information database;

storing a location of the telephone network database in the unbundled port information database;

transmitting a query for requested information to an unbundled port service control point with access to the unbundled port information database, the query containing an identity of an originating network;

determining an access right of the originating network based upon the access right of the at least one originating network stored in the unbundled port information database; and transmitting the query to the telephone network database if the originating network has been determined to have the access right.

10. The method for controlling access to information, as recited in claim 9, further comprising the step of transmitting the information requested in the query to the originating network.

11. The method for controlling access to information, as recited in claim 9, further comprising the step of transmitting a response back to the originating network if the originating network has been determined to not have an access right.

12. The method for controlling access to information, as recited in claim 9, wherein the query is a line information database query.

13. The method for controlling access to information, as recited in claim 9, wherein the query is a calling name information query.

14. A system for controlling access to information stored in a telephone network database comprising:

an unbundled port service control point;

an unbundled port information database coupled to the unbundled port service control point, the unbundled port information database storing an unbundled port identifier and an information service identifier;

a signal transfer point coupled to the unbundled port service control point, the signal transfer point routing a query for requested information from an originating network to the unbundled port service control point; and the unbundled port service control point determining access rights of the originating network to the requested information, and if the originating network has been determined to have the access rights, causing the query to be transmitted to the telephone network database.

15. The system for controlling access to information, as recited in claim 14, wherein the unbundled port identifier further comprises:

an identifier of a service provider; and a dialing number identifying a subscriber of the service provider.

16. The system for controlling access to information, as recited in claim 14, wherein the information service identifier further comprises:

a location of the information database; and an access right to information stored in the information database for at least one network.

17. The system for controlling access to information, as recited in claim 14, wherein the query is a line information database query.

18. The system for controlling access to information, as recited in claim 14, wherein the query is a calling name information query.

* * * * *